Aug. 19, 1930.  F. M. HARTFORD  1,773,675
METHOD AND APPARATUS FOR DRYING OR ROASTING
CLAY, CARBON, OR OTHER PRODUCTS
Filed March 1, 1928  2 Sheets-Sheet 1
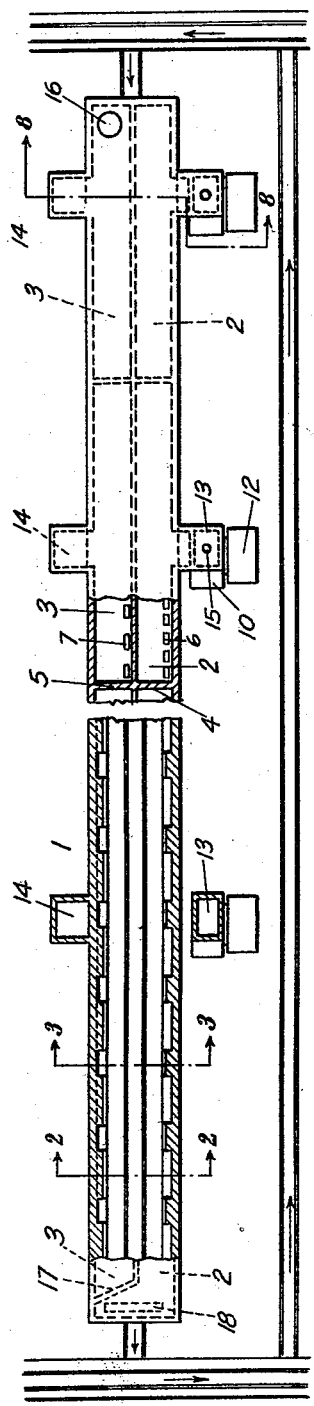
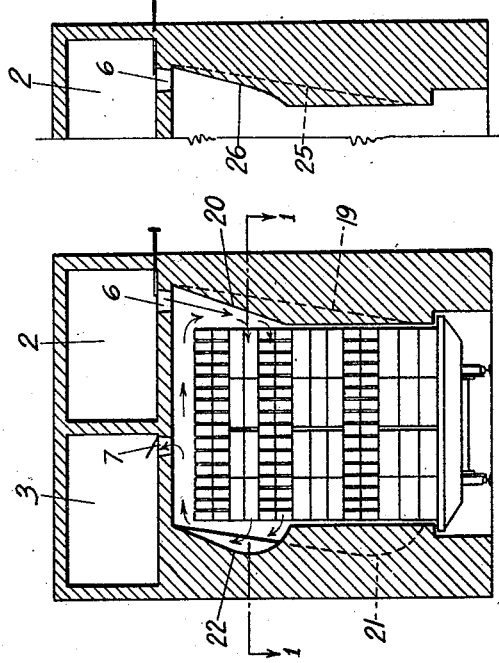
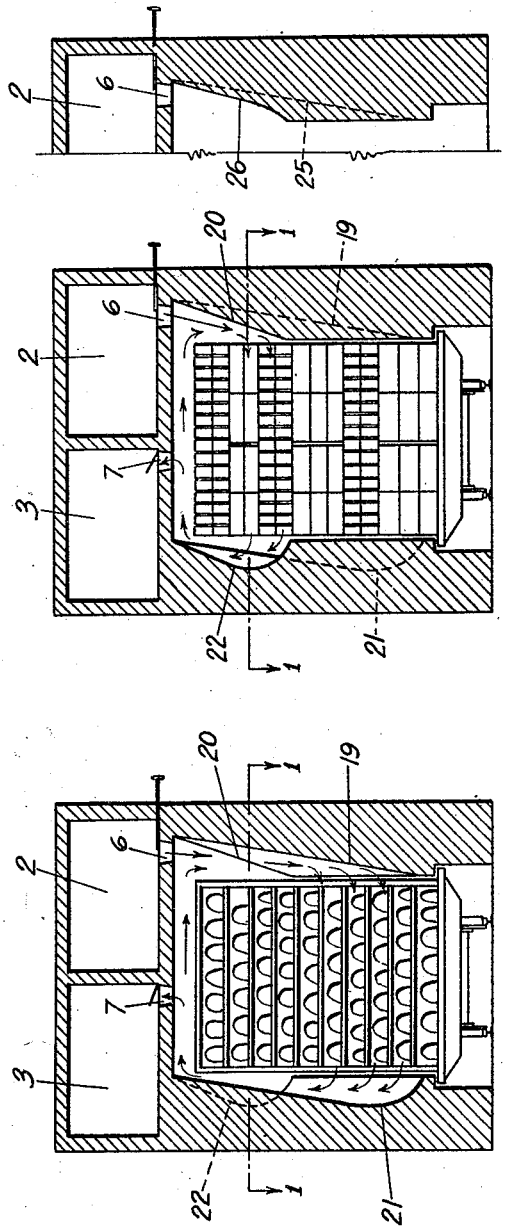
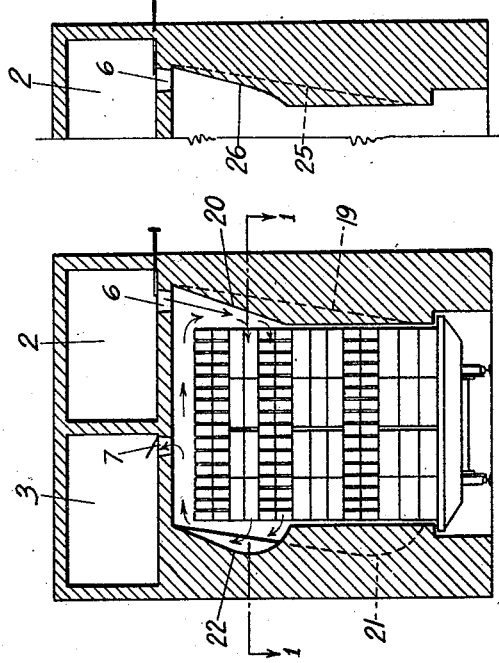
INVENTOR.
Frank M. Hartford.
BY
ATTORNEYS.

Aug. 19, 1930.                F. M. HARTFORD                1,773,675
         METHOD AND APPARATUS FOR DRYING OR ROASTING
              CLAY, CARBON, OR OTHER PRODUCTS
                   Filed March 1, 1928       2 Sheets-Sheet 2
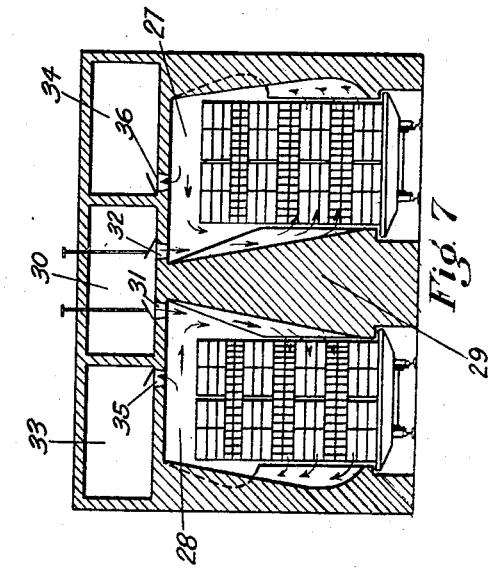
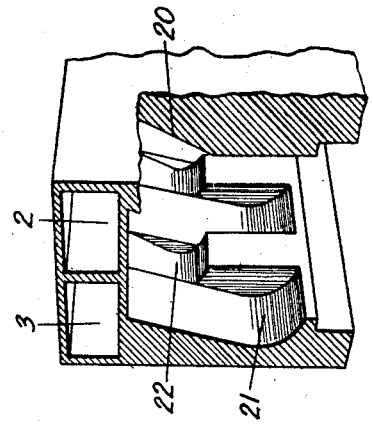
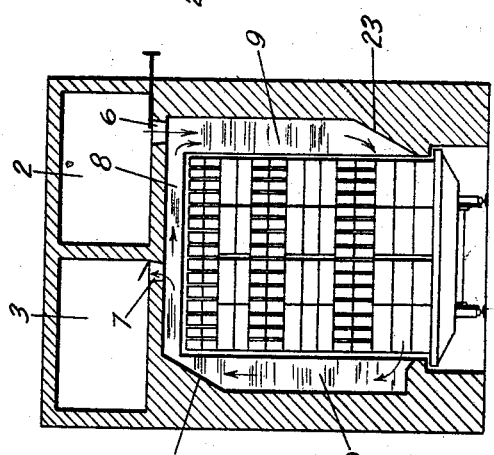
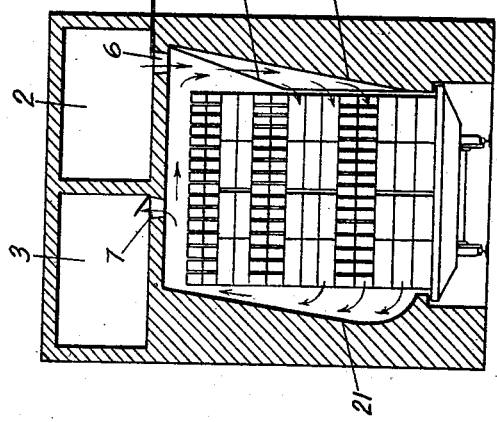
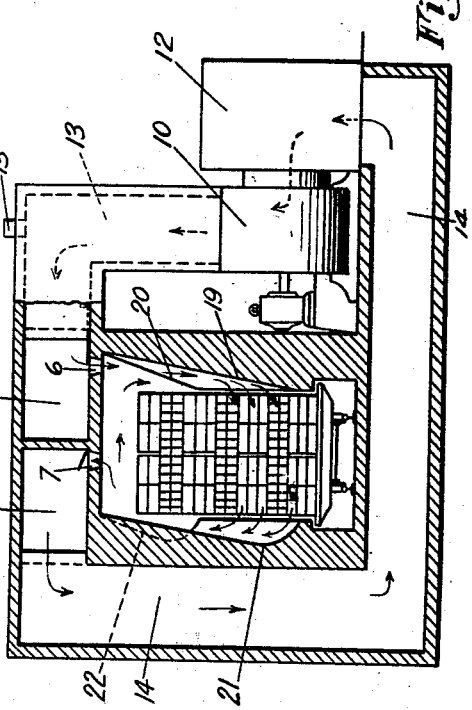
INVENTOR.
Frank M. Hartford
BY
Edwin P. Corter
ATTORNEYS.

Patented Aug. 19, 1930

1,773,675

UNITED STATES PATENT OFFICE

FRANK M. HARTFORD, OF COLUMBUS, OHIO, ASSIGNOR TO THE HARROP CERAMIC SERVICE COMPANY, OF COLUMBUS, OHIO, A CORPORATION OF OHIO

METHOD AND APPARATUS FOR DRYING OR ROASTING CLAY, CARBON, OR OTHER PRODUCTS

Application filed March 1, 1928. Serial No. 258,247.

My invention relates to method and apparatus for drying or roasting clay, carbon or other products. It is particularly applicable to a tunnel drier, oven or roaster structure, wherein the drying or roasting is either periodic, batch type, or continuous, but is not limited to either one.

Previous drying ovens or roasters, for products of the above class, have not been entirely satisfactory. In most cases, the temperature and other conditions within the treating chamber are not sufficiently uniform. For instance, it is generally the case that whenever the temperature adjacent the top of the treating chamber is sufficiently high, the temperature adjacent the bottom of the chamber is too low. However, it occasionally occurs that the reverse conditions arise and that the temperature adjacent the bottom of the treating chamber is sufficiently high whereas the temperature adjacent the top of the chamber is too low.

One object of my invention is to provide a tunnel drier, oven or roaster structure for such products, wherein the entire charge will be properly and thoroughly treated by means of vigorous and turbulent circulation of the treating medium, whether this medium be introduced primarily for heating or for other purposes.

Another object of my invention is to provide efficient controlling means for obtaining a uniform treatment of the products.

In the preferred form of my invention, I pass a continuous train of cars, laden with the product, through the tunnel drier, oven or roaster structure, drawing one or more of the product-laden cars from the discharging end and then introducing one or more product-laden cars into the charging end. However, my treating chamber may also be used equally well for periodic or batch treatment. To accomplish the drying or roasting of the products, I introduce the drying or roasting medium, which may be pure hot air, waste or other gases, into the tunnel drier or roaster structure at various points along its length. This drying or roasting medium, whose temperature, humidity or other properties are controllable within certain limits, is preferably forced into the treating chamber at various points along its length and then caused to pass downwardly around the products, laterally through the products and then upwardly where a portion of the medium is caused to recirculate within the chamber, while another portion is withdrawn, reheated and again delivered to the chamber, as first described.

The walls of the treating chamber of my device are preferably so constructed that the treating medium is given a substantially swirling path of movement from the time it is introduced into the treating chamber until it is discharged therefrom. Furthermore, the walls of the treating chamber are provided with such special contours that the treating medium, after entering the treating chamber, will be forced or crowded through all portions of the product being treated with a controlled uniformity. In other words, in so far as is possible, a part of the treating medium will be conducted to and crowded through one portion of the product and other parts of the treating medium will be conducted to and crowded through other portions of the ware setting to such an extent that complete and uniform treatment of all portions of the product will be ensured.

The preferred embodiment of my invention is shown in the accompanying drawings wherein similar characters of reference designate corresponding parts and wherein:

Figure 1 is a partly sectional top plan view, taken on the lines 1—1 of Figures 2 and 3, of a tunnel drier or roaster structure built in accordance with my invention.

Figure 2 is a view, partly in section, taken on the line 2—2 of Figure 1.

Figure 3 is a view similar to Figure 2 but taken on the line 3—3 of Figure 1.

Figure 4 is a sectional view, partly broken away, showing a modification of my invention which embodies a side wall that is shaped differently from those shown in Figures 2 and 3.

Figures 5 and 6 are cross-sectional views showing further modifications of my invention embodying differently shaped side walls.

Figure 7 is a cross-sectional view of a tunnel drier or roaster structure embodying the principles of my invention in a modified form.

Figure 8 is a view, partly in section, taken on the line 8—8 of Figure 1 illustrating the path of circulation of the treating medium.

Figure 9 is a perspective view, partly in section, of the preferred form of tunnel structure that I employ.

In the drawings, with particular reference to Figures 1 to 6, and 8 and 9, my drier, oven or roaster is shown as comprising a treating chamber in the form of a tunnel 1. Superimposed upon the top of this tunnel 1 are a series of pairs of ducts 2 and 3. These pairs of ducts are separated from each other by transverse partitions 4 and 5.

The ducts 2 communicate with the interior of the treating chamber by means of damper-controlled ports 6 leading downwardly through the roof of the treating chamber and the ducts 3 also communicate with the interior of the treating chamber by means of damper-controlled ports 7 leading upwardly through the roof of the treating chamber and into the ducts 3.

The provision of the transverse partitions 4 and 5 which separate the several series of ducts from each other practically results in dividing my drier, oven or roaster into a series of related units. This effect may be accentuated, if desired, by the provision, in the treating chamber 1, of a series of drop curtains 8 with associated pilasters 9 preferably disposed in substantial alignment with the transverse partitions 4 and 5.

Means is provided for positively effecting circulation and recirculation of the treating medium through the tunnel 1, a circulating means being preferably provided for each pair of ducts 2 and 3. This means is illustrated best in Figure 8 and it preferably comprises a power-driven fan 10. Associated with this fan 10 and preferably connected to the inlet thereof is a heating unit 12 which may take any suitable form. The outlet of the fan 10 connects with a riser 13, which leads directly into one of the heating medium ducts 2. The heating medium thus delivered to the duct 2 then passes downwardly through the damper-controlled ports 6 and is given a swirling action in the treating chamber. It eventually leaves the treating chamber through the damper-controlled ports 7, passing into the duct 3. From the duct 3, it passes into a recirculation duct 14 which conducts it back to the inlet end of the heating unit 12. A dampered vent 15 may be provided anywhere in the riser 13, duct 2 or duct 3 or wherever desirable, to permit of the disposition of excess gases or to prevent the building up of an undesirable pressure or temperature in this riser or ducts, or in the recirculating system, generally. Inlets may also be provided anywhere in this circulating system to admit additional gases, if desired.

By reference to Figure 1, it will be noted that the duct 3 at the charging end of the drier, oven or roaster is provided with a vent 16. It will also be noted that, from the duct 2 at the discharging end of my device, an elongated port 18 leads downwardly into the treating chamber 1. Due to the delivery of treating medium through port 18 and owing to the presence of the outlet 16 at the charging end of my device, the swirling air currents within the treating chamber are given a general trend of movement toward this charging end of the tunnel. This both causes the swirling, treating medium to have a general tendency toward spiral movement and, also, serves to confine to the charging end of the device any fire-controlling medium which it may be desirable to introduce into this charging end.

It should be understood that the general trend of movement of the treating medium may be toward the discharging end of the tunnel, if desired. Likewise, the port 18 and vent 16 may be placed at varying positions and in varying locations with relation to each other in order to confine any fire-controlling medium or other additional medium to any desired location. My invention contemplates the adaptation of this feature to such conditions as they arise.

It will be noted that the internal contour of my treating chamber is irregular. This is for a distinct purpose. More specifically, the walls of my treating chamber are given special contour for the purpose of controlling and directing the treating medium to all parts of the product to be treated with certainty and uniformity.

In order to ensure this, I have provided, in the form shown, in Figures 2, 3 and 8, the interior surface of one of the vertical walls with a series of inclined planes 19 which commence adjacent the inlet ports 6 at points relatively remote from the top of the product and which gradually approach the product as they progress downwardly until they are in close juxtaposition to the product at the base thereof. Intermediate these comparatively elongated inclined planes, I have provided comparatively short inclined planes 20 which approach the product more sharply as they progress downwardly until they are in close juxtaposition thereto at about midway between the base and top thereof.

Likewise, in the form shown in Figures 2, 3, 5 and 8, the interior of the opposing wall is specially contoured. In Figures 2, 3 and 8, the comparatively long inclined planes 19 on the wall previously described are opposed by comparatively long curved incut surfaces 21 while the comparatively short inclined planes 20 are opposed by comparatively short incut curves 22.

The result of this structure is that the drying medium introduced through the ports 6 into the treating chamber is directed downwardly and inwardly. A portion of it is conducted down approximately to the base of the product by the long inclined planes and, by these planes, is forced and crowded across through the lower portion of the product and then passes upwardly in a curved path along the incut curved surfaces 21. At the same time, a portion of this drying medium is conducted only approximately to points halfway down the product by the short inclined planes and, by these planes, is crowded and forced laterally through the upper portion of the product. This ensures thorough and uniform treatment of the product.

In the form shown in Figure 5, the short incut curves 22 are dispensed with, although the long planes 19 and the short planes 20 are utilized.

In the form shown in Figure 6, the short inclined planes 23 are provided and the upper ends of these inclined planes are disposed somewhat below the center of the product. The opposing wall is cut away in an angular manner and is provided at its upper end with an inwardly and upwardly directed inclined plane 24.

It will be understood that these irregularities in the internal surfaces of the walls of the treating chamber may be varied in many different ways to meet varying conditions which may be dependent upon the nature of the product being treated, the results sought or other conditions.

Figure 4 illustrates a still different contour of wall embodying long inclined planes 25 and short curved inclined planes 26.

Figure 7 shows the application of my invention to a dual chamber construction. In this construction, the treating chambers are designated 27 and 28 and they are separated longitudinally by a central wall 29. Disposed above this central longitudinal wall 29 is an inlet duct 30 which receives the treating medium and delivers it through ports 31 and 32 into the treating chamber. On the outer sides of this duct 30 are outlet ducts 33 and 34 which receive the treating medium from the treating chamber through outlet ports 35 and 36. It will be understood that these ducts may all be damper-controlled. The direction of the arrows and the contours of the walls shown in this figure are evident and it is believed that the direction of movement of the treating medium will be clear by an inspection of the figure.

It will be understood that I have shown my invention in application to a tunnel structure wherein the product passes continually through the treating chamber. However, it will be obvious that my invention is also applicable to other types of structures and to periodic or batch treatment. It will likewise be obvious that my invention is not necessarily limited to products mounted upon cars but may be applied to products mounted upon belts or, in fact, upon any type of supporting or conveying device.

There is always a possibility of fire starting in the treating chambers of devices of this type, but I have already explained the means which I have provided for creating a draft to substantially confine any fire-extinguishing medium to the charging end or to other definite locations within the chamber.

Under certain conditions, I may find it desirable to so arrange the sets of ducts and the circulating apparatus therefor that the treating medium will be introduced into the treating chamber at one side thereof and will move across the treating chamber in one direction immediately beneath one set of ducts, while one or more of the other sets of ducts and the circulating apparatus therefor will be so arranged as to introduce the treating medium into the opposite side of the treating chamber and cause it to move across such heating chamber in an opposite direction.

Having thus described my invention, what I claim is:

1. A treating chamber for heat-treating products comprising a plurality of inclined plane surfaces of varying lengths horizontally staggered so as to direct the treating medium through different portions of the product.

2. A treating chamber for heat-treating products, comprising means for introducing a treating medium downward alongside the product, and inclined surfaces of varying lengths horizontally staggered in and on the opposing walls of said chamber for deflecting the treating medium positively through the product.

3. A treating chamber for heat-treating products, comprising means for introducing a treating medium alongside the product, and inclined surfaces of varying lengths horizontally staggered within said treating chamber terminating at different levels.

4. A treating chamber for heat-treating products, comprising means for introducing a treating medium alongside the product, and oppositely disposed spaced inclined surfaces of different lengths horizontally staggered within said treating chamber.

5. A treating chamber for heat treating products comprising a plurality of inclined plane surfaces horizontally staggered and so disposed as to direct the treating medium through different portions of the product, said inclined plane surfaces having their point of origin at the same level and terminating at different levels.

6. A treating chamber for heat treating products comprising a plurality of opposing inclined plane surfaces so disposed as to direct the treating medium through different portions of the product, the opposing inclined plane surfaces of said treating chamber being reversely contoured.

7. A treating chamber for heat treating products with a treating medium comprising means for introducing a treating medium into said treating chamber and means for withdrawing said medium from said chamber, the interior confines of said treating chamber embodying inclined surfaces horizontally staggered and differing in contour and angularity, originating at the same level and terminating at different levels.

8. Apparatus for heat treating products comprising a tunnel structure, a plurality of abutments extending into said tunnel structure and having their respective faces inclined, and a plurality of cavities in said tunnel structure having vertically inclined plane surfaces.

9. Apparatus for heat treating products comprising a tunnel structure, a plurality of sets of ducts disposed in parallel relation to said tunnel structure, means for introducing a treating medium from certain of said ducts into the interior of said tunnel structure and onto a plurality of inclined plane horizontally staggered surfaces of varying lengths and terminating at varying levels, the points or origin of said plane surfaces being at the same level, and means for withdrawing said treating medium into other of said ducts.

10. Apparatus for heat treating products comprising a treating chamber whose walls are especially contoured to direct the treating medium through the products in different paths in successive zones.

11. Apparatus for heat treating products comprising a treating chamber whose walls are provided with a series of special contours and with adjacent contours differing so as to conduct successive currents of treating medium through the products in different paths.

12. A treating chamber for heat treating products comprising a tunnel structure, means for conveying a treating medium thereto, means for introducing the treating medium downwardly alongside said product direct from said conveying means, and means embodying opposed inclined and concave surfaces for deflecting portions of said downwardly moving treating medium laterally through the lowermost levels of said product.

13. A treating chamber for treating products with a gaseous medium comprising opposing walls, one of said walls having an inclined surface and that of the opposite wall having a concave surface.

14. A treating chamber for treating products with a gaseous medium comprising opposing walls, one of said walls having an inclined surface and that of the opposite wall having a concave surface, the respective surfaces of each of said walls originating and terminating in substantially the same horizontal planes.

15. A treating chamber for treating products with a gaseous medium comprising opposing walls, one of said walls having inclined plane surfaces at different levels and that of the opposite wall having concave surfaces terminating at corresponding levels.

In testimony whereof I, hereby, affix my signature.

FRANK M. HARTFORD.